United States Patent
Vedurmudi

(10) Patent No.: US 8,825,015 B2
(45) Date of Patent: Sep. 2, 2014

(54) ACCESSING WEB PAGES ON COMMUNICATION PATHS WITH LOW BANDWIDTH

(75) Inventor: Sriharsha Vedurmudi, Hyderabad (IN)

(73) Assignee: Nvidia Corporation, Santa Clara, CA (US)

( * ) Notice: Subject to any disclaimer, the term of this patent is extended or adjusted under 35 U.S.C. 154(b) by 886 days.

(21) Appl. No.: 12/212,702

(22) Filed: Sep. 18, 2008

(65) Prior Publication Data

US 2010/0069051 A1 Mar. 18, 2010

(51) Int. Cl.
*H04M 1/725* (2006.01)
*H04M 1/663* (2006.01)

(52) U.S. Cl.
USPC .......... 455/412.2; 455/412.1; 455/414.1; 455/418; 455/466; 455/550.1

(58) Field of Classification Search
USPC .......... 455/414.1, 414.2, 414.3, 414.4, 412.2, 455/566, 550.1, 412.1, 418, 466
See application file for complete search history.

(56) References Cited

U.S. PATENT DOCUMENTS

| | | | |
|---|---|---|---|
| 5,321,696 A * | 6/1994 | Buchholz et al. | 370/312 |
| 6,510,461 B1 * | 1/2003 | Nielsen | 709/224 |
| 6,567,492 B2 | 5/2003 | Kiselev et al. | |
| 6,714,985 B1 * | 3/2004 | Malagrino et al. | 709/236 |
| 6,731,929 B2 * | 5/2004 | Winkler | 455/414.4 |
| 6,845,408 B1 | 1/2005 | Lemke et al. | |
| 7,054,659 B2 | 5/2006 | Gioscia et al. | |
| 7,065,704 B1 * | 6/2006 | Xu | 715/205 |
| 7,203,531 B2 * | 4/2007 | Kido | 455/575.3 |
| 7,233,787 B2 * | 6/2007 | Higuchi et al. | 455/414.1 |
| 7,251,704 B2 * | 7/2007 | Solomon et al. | 710/316 |
| 7,441,108 B2 | 10/2008 | Fisher et al. | |
| 7,693,546 B1 | 4/2010 | Gioscia et al. | |
| 8,340,058 B2 | 12/2012 | Vedurmudi | |
| 8,607,296 B1 * | 12/2013 | Harvey et al. | 725/135 |
| 2001/0035859 A1 | 11/2001 | Kiser et al. | |
| 2003/0064805 A1 | 4/2003 | Wells | |
| 2004/0214551 A1 * | 10/2004 | Kim | 455/412.1 |
| 2005/0190747 A1 | 9/2005 | Sindhwani et al. | |
| 2005/0193143 A1 | 9/2005 | Meyers et al. | |
| 2006/0128419 A1 * | 6/2006 | Shimizu et al. | 455/550.1 |
| 2007/0004400 A1 | 1/2007 | McClung et al. | |
| 2007/0049276 A1 | 3/2007 | Rimoni et al. | |
| 2007/0091845 A1 | 4/2007 | Brideglall | |
| 2007/0123323 A1 | 5/2007 | Zhu et al. | |
| 2007/0159998 A1 | 7/2007 | Ruuska et al. | |
| 2007/0263605 A1 | 11/2007 | Estevez et al. | |
| 2007/0280200 A1 | 12/2007 | Patel | |
| 2008/0004052 A1 | 1/2008 | Bloebaum et al. | |
| 2008/0089289 A1 | 4/2008 | Jayaram et al. | |

(Continued)

FOREIGN PATENT DOCUMENTS

EP 1791098 A2 5/2007
JP 2105215 A 4/1990

(Continued)

*Primary Examiner* — Olumide T Ajibade Akonai

(57) ABSTRACT

A mobile phone provided according to an aspect of the present invention generates a non-visual human perceptible signal (e.g., sound or touch/vibration) after the data representing a web page content is received. Due to such a feature, the user need not watch a display screen of the mobile phone to know that the web page is displayed. The use-friendliness is enhanced when accessing the web pages over low bandwidth communication paths.

16 Claims, 3 Drawing Sheets

(56) References Cited

U.S. PATENT DOCUMENTS

| | | |
|---|---|---|
| 2008/0107051 A1 | 5/2008 | Chen |
| 2008/0161071 A1 | 7/2008 | Sherman |
| 2008/0198818 A1 | 8/2008 | Montemurro et al. |
| 2008/0291830 A1 | 11/2008 | Pernu et al. |
| 2008/0299987 A1 | 12/2008 | Iyer et al. |
| 2009/0022103 A1 | 1/2009 | Shatsky |
| 2009/0047991 A1 | 2/2009 | Elg |
| 2009/0104940 A1 | 4/2009 | Seshadri et al. |
| 2009/0176482 A1* | 7/2009 | Martin et al. ............ 455/414.3 |
| 2009/0181699 A1* | 7/2009 | Tysowski ................. 455/457 |
| 2009/0310580 A1 | 12/2009 | Chapman et al. |
| 2009/0318085 A1 | 12/2009 | Seshadri et al. |
| 2009/0325650 A1 | 12/2009 | Seshadri et al. |
| 2010/0035657 A1* | 2/2010 | Blenessy et al. ............. 455/566 |
| 2010/0087178 A1* | 4/2010 | Vander Veen ............. 455/414.2 |
| 2010/0198935 A1 | 8/2010 | Stepanian |
| 2010/0235421 A1 | 9/2010 | Liu |

FOREIGN PATENT DOCUMENTS

| | | |
|---|---|---|
| JP | 05158601 A2 | 6/1993 |
| JP | 7005689 U | 1/1995 |
| JP | 2003154170 A | 5/2003 |
| JP | 2005136518 A2 | 5/2005 |
| JP | 2006004063 A | 1/2006 |
| WO | 2006028203 A1 | 3/2006 |

* cited by examiner

ACCESSING WEB PAGES ON COMMUNICATION PATHS WITH LOW BANDWIDTH

BACKGROUND

1. Field of Disclosure

The present disclosure relates generally to mobile phones, and more specifically to enhancing user friendliness in accessing web pages on communication paths with low bandwidth.

2. Related Art

A mobile phone refers to a device which communicates via base stations of a cellular network, using technologies such as GSM, CDMA, TDMA, etc., as is well known in the relevant arts. Using the interface provided by a base station, a mobile station can typically establish calls (voice or data) with various recipients of interest, as is well known in the relevant arts.

Mobile phones are often provided with the requisite capabilities (e.g., a web browser) to access web pages from various sources. As is well known, a web page generally contains content according to a pre-specified format (e.g., HTML) such that the information can be rendered on a display unit of a digital processing system.

One challenge with accessing web pages is that there are often situations in which the bandwidth on a communication path (particularly from the mobile phone to the gateway noted above) is low. For example, the data connections provided based on General Packet Radio Service (GPRS) in the context of GSM network generally have bandwidths of the order of 8 kbps-20 Kbps, which is quite low compared to the high speed connections possible using other mediums/technologies such as digital subscriber line (DSL) technology (which provides bandwidths in the range of 56 Kbps to more than 2 Mbps).

The limited bandwidth makes the time to complete downloads rather long, making it inconvenient for the users, often testing their patience, while waiting for the downloads to complete. It is generally desirable that mobile phones be user friendly when web pages are accessed using low bandwidth communication paths.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

A mobile phone provided according to an aspect of the present invention generates a non-visual human perceptible signal (e.g., sound or touch/vibration) after the data representing a web page content is received. Due to such a feature, the user need not watch a display screen of the mobile phone to know that the web page is displayed. The use-friendliness is thus enhanced when accessing the web pages over low bandwidth communication paths.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

Example Environment

Figure 1:
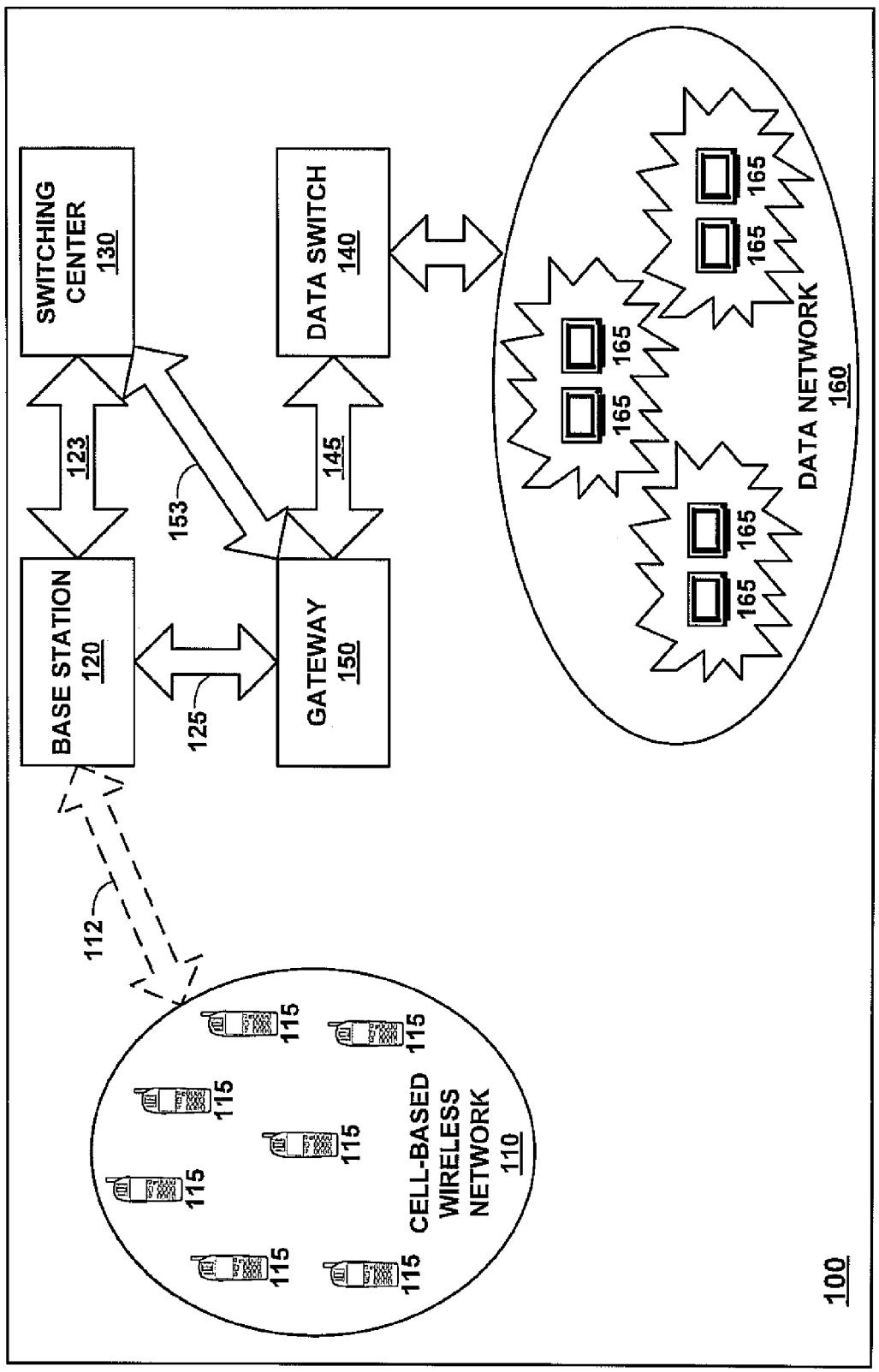
FIG. 1 is a block diagram illustrating an example communication system in which various aspects of the present invention may be implemented.

FIG. 1 is a block diagram illustrating the details of an example communication system in which the present invention can be implemented. Communication system 100 is shown containing cell-based wireless network 110, base station 120, switching center 130, data switch 140, gateway 150, and data network 160. Each system is described below in further detail.

Cell-based wireless network 110 is shown containing several mobile phones (only some shown as 115), which are generally designed for voice calls using cell-based technologies (e.g., GSM, CDMA, etc.). Mobile phones 115 may also be provided data connectivity using protocols such as GPRS described in further detail in a document sentitled. "3GPP TS 29.018 V4.20 (2001-12); 3rd Generation Partnership Project; Technical Specification Core Group Network; General Packet Radio Service (GPRS); Serving GPRS Support Node (SGSN)-Visitor's Location Register (VLR); Gs interface layer 3 specification (Release 4)", (hereafter "GPRS Document") available from 3GPP support office address, 650 Route des Lucioles-Sophia Antipolis, Valbonne-FRANCE, Tel.: +33 4 92 94 42 00. In general, each mobile phone 115 sends/receives packets to/from base station forming the basis for various voice/data connections.

Base station 120 operates to transmit/receive packets to/from mobile phones. The packets (received from mobile phones 115) related to data connections may be forwarded to gateway 150, and packets related to voice calls or control operations (such as for setting up a channel) may be forwarded to switching center 130. Similarly, base station 120 receives packets from gateway 150 and switching center 130, and forwards each packet to the corresponding mobile phone 115. Base station 120 may operate consistent with ITU and ETSI standards described in further detail in a book entitled "The GSM System for Mobile communications", by M. MOULY and M. B. PAUTET, ISBN 2-9507190-0-7. In such an environment, base station 120 is referred to as a base station system (BSS).

Switching center 130 is generally responsible for setting up, managing, and clearing connections (to mobile phones) as well as routing the cell data elements to the appropriate cell in cell-based wireless network 110. Though not shown, switching center 130 facilitates connection with mobile phone in other cell areas (such as 110) and PSTN. Switching center 130 may operate consistent with various ITU and ETSI standards noted above. In such an environment, switching center 130 is referred to as a mobile switching center.

Gateway 150 interfaces with data switch 140, base station 120 and switching center 130 on paths 145, 125 and 153 respectively, to provide data connectivity for mobile phones 115. In an embodiment, gateway 150 is implemented according to standard, which is described in further detail in document entitled, "GPP TS 23.060, V5.2.0 (2002-06), 3rd Generation Partnership Project; Technical Specification Group Services and System Aspects; General Packet Radio Service (GPRS), Service Description; Stage 2". In such an environment, gateway 150 is referred to as a SGSN and is responsible for the delivery of data packets from and to the mobile phones within its cell area. Its tasks include packet routing and transfer, mobility management (attach/detach and location management), logical link management, and authentication and charging functions.

Data switch 140 provides the necessary connectivity between data network 160 and gateway 150 when data connections are provided to mobile phones in cell-based wireless network 110. In an embodiment, data switch 140 interfaces with gateway 150 using GTP (GPRS Tunneling Protocol) on path 145 and is referred to as gateway GPRS support node (GGSN). As is well known, GGSN acts as an interface between the GPRS backbone network and the external data network 160. It converts the GPRS packets coming from the SGSN into the appropriate packet data protocol (PDP) format (e.g. IP or X.25) and sends them out on the corresponding packet data network. In the other direction, PDP addresses of incoming data packets are converted to the GSM address of the destination user. The readdressed packets are sent to the responsible SGSN (here, gateway 150). For this purpose, data switch 140 stores the current SGSN address of the user and his or her profile in its location register. The GGSN is responsible for IP address assignment and is the default router for the mobile phones.

Data network 160 contains several servers 165, which provide web pages for download by various mobile phones. Each server 165 is designed to receive a request for a web page (e.g., identified by a Uniform Resource Locator (URL)), constructs a corresponding web page, and sends the constructed page to the requesting mobile phone 115. In the present application, data network 160 is assumed to be implemented based on Internet Protocol (IP), though other protocols (e.g., X.25 noted above) can be used in alternative embodiments.

Each web page sent by server 165 may be in the form of multiple IP packets. Server 165 forwards the IP packets to data switch 140, which in turn forwards the IP packets to gateway 150 based on the destination IP address. Gateway 150 breaks the packet into multiple GPRS packets in a size suitable for eventual transmission to mobile phone 115. Gateway 150 interfaces with base station 120 to cause the GPRS packets to be delivered to the specific mobile phone 115 which had earlier sent the web page request. Mobile phone 115 thus receives the GPRS packets and recovers the payload data representing the received web page, and displays the same using a suitable interface.

It may be appreciated that the bandwidth available to the data connection during such web page transfers may be small. As a result, the user may impatiently wait for the web page download to complete. Such travails experienced by users may be mitigated according to various aspects of the present invention, as described below in further detail.

User Friendly User Interface

Figure 2:
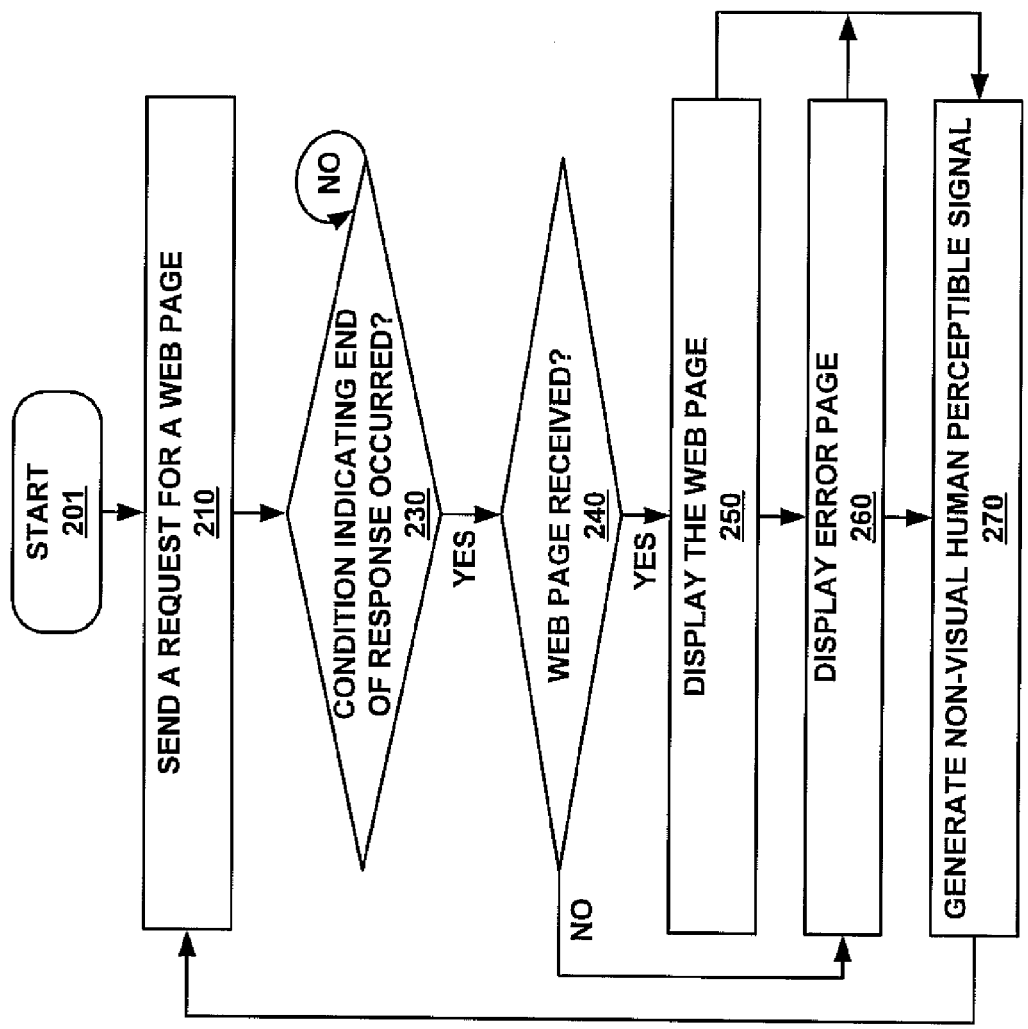
FIG. 2 is a flow chart illustrating the manner in which user friendliness is enhanced when accessing web pages on a low bandwidth communication link in an embodiment of the present invention.

FIG. 2 is a flowchart illustrating the manner in which user friendliness is enhanced when web pages are downloaded to a mobile phone in an embodiment of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, mobile phone 115 sends a request for a web page. In a typical scenario, a user (human being) enters a URL of interest on a suitable portion of a web browser software or clicks on a hyperlink text of a previous displayed web page. Accordingly, a URL indicating the requested web page is transmitted (in a TCP/IP packet) in one or more GPRS packets. The payload (which typically follows the header) of such one or more GPRS packets may together form an IP packet. Gateway 150 forms the IP packet from the payload(s) and forwards the packet to data network 160. The packet is delivered to one of the servers 165, as determined by the destination address in the IP packet. The corresponding server generates the web page (e.g., in HTML format) in the form of one or more IP packets, which are sent back to the mobile phone 115 in the form GPRS packets (e.g., according to HTTP protocol).

In step 230, mobile phone 115 determines whether a condition indicating end of response has occurred. Assuming that the web page is accurately delivered to mobile phone 115, the condition corresponds to receiving the last GPRS packet. As is well known in the relevant arts, the end of web page is indicated by an appropriate convention within the payload content and when the end of the web page is detected, the condition is deemed to be satisfied. When only a partial web page is received (e.g., the underlying TCP connection is reset due to some error situation), such a situation is also deemed to be a condition indicating the end of response.

The end of response is deemed to occur in other situations as well. For example, if a next GPRS packet (as a response to the request) is not received in a certain time duration, mobile phone 115 may deem that the condition has occurred and close the underlying TCP connection. A timer may be started upon receiving each packet (if that packet is not the last packet for the web page), and if a subsequent packet is not received by the time the timer expires, mobile phone 115 may deem that the condition has occurred. Alternatively, the timer may be associated with the download of the entire web page in alternative embodiments.

Control transfers to step 240 if the condition is deemed to have occurred or else control remains at step 230. In step 240, mobile phone 115 determines whether at least a part of the web page is received. Once one or more packets are received as a response to the request of step 210, web page content may be deemed to be received. Control transfers to step 250 if a web page is received and to step 260 otherwise.

In step 250, mobile phone 115 displays the received web page and control transfers to step 270. The web page may be received according to HTML format using HTTP protocol on top of TCP/IP. In step 260, mobile phone 115 displays an appropriate error message (e.g., web page timed out) and control then passes to step 270.

In step 270, mobile phone 115 generates a non-visual human perceptible signal to indicate that the response is complete. It should be appreciated that the non-visual human perceptible signal is not based on any content (of the received web page) indicating such a signal is to be generated. Rather, mobile phone 115 generates the non-visual human perceptible signal independent of the specific content of the web page and is generated to indicate the condition of step 230 has occurred. The term independent of implies that the content of the received page does not specify that the signal be generated. As a result, if other browsers not providing the feature of the invention process the same web page, the non-visual human perceptible signal may not be generated.

In an embodiment, a sound signal is conveniently generated. Thus, a user can send a web page request in step 210 and wait for the sound signal to know the completion of the response. As a result, a user can cause a URL to be sent and then not look at the display screen only after receiving a sound signal.

Alternatively, a vibrator (often provided with the mobile phones) may be actual to provide a touch sense to the user. As yet another alternative, smell causing substance may be dispensed to indicate that mobile phone 115 has completed processing the request of step 210. Control then transfers to 210 to facilitate a user to send a next web page. In general, a user may be provided the option to select the specific signals (audio and/or vibration, etc.) to be generated, the duration of the signals, etc. Mobile phone 115 then may be provide the selected signals consistent with the user configured options.

In the common situations when web pages are being downloaded according to the low bandwidth, it may be observed that a sound signal (or vibration or smell) is generated upon completion of download or display of a requested web page. Thus, a user may conveniently engage in any other tasks of interest, possibly unrelated to the mobile phone, during the (long) time taken for the web page to be downloaded. As a result, the mobile phone may be more user friendly when downloading web pages over low bandwidth communication path (in this case wireless path 112 to base station 120).

While step 270 is shown as being performed after display of the web page, it should be appreciated that the step can be performed any time after step 230 since the performance of steps 240, 250 and 260 takes minimal time (as being within the 'control' of mobile phone 115).

It may be further appreciated that the features described above may be implemented using a desired combination of hardware, software and firmware. In an embodiment, at least some of the features are operative upon execution of appropriate software instructions stored on a computer readable storage medium, as described below in further detail.

Mobile Phone Detail

Figure 3:
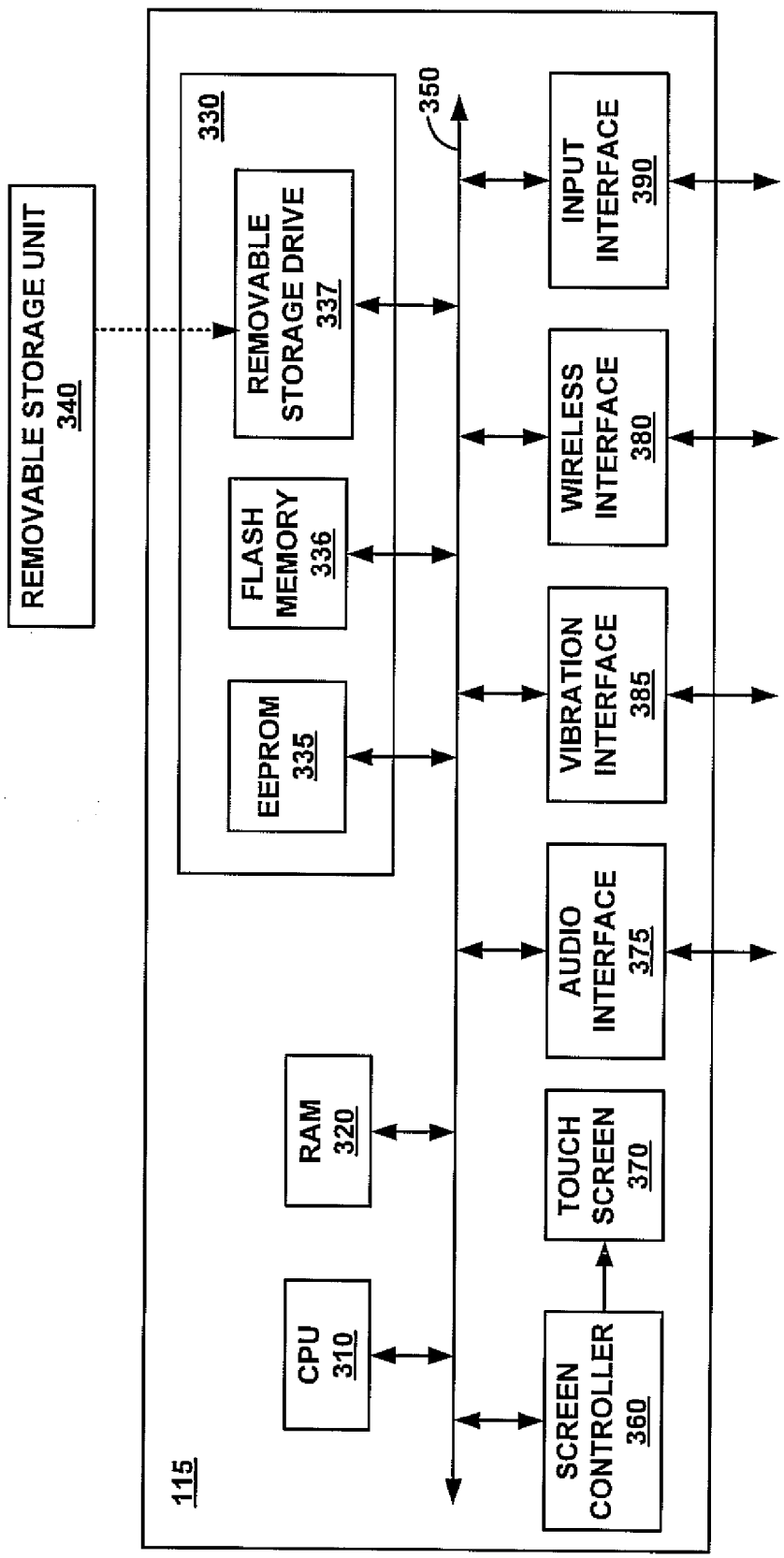
FIG. 3 is a block diagram illustrating the details of an example mobile phone in which various features are operative upon execution of the appropriate software instructions.

FIG. 3 is a block diagram illustrating the details of mobile phone 115 in which several aspects of the present invention are operative by execution of appropriate software instructions. Mobile phone 115 may contain one or more processors (such as a central processing unit (CPU) 310), random access memory (RAM) 320, secondary memory 330, screen controller 360, touch screen 370, audio interface 375, vibration interface 385, wireless interface 380, and input interface 390. All the components except display unit 370 may communicate with each other over communication path 350, which may contain several buses as is well known in the relevant arts. The components of FIG. 3 are described below in further detail.

CPU 310 may execute instructions stored in RAM 320 to provide several features of the present invention. For example, CPU 310 receive a URL from screen controller, send the URL using wireless interface 350, receive packets containing web page content from wireless interface 380, and provide non-visual human perceptible signal using audio interface 375 and/or vibration interface 385. CPU 310 may contain multiple processing units, with each processing unit potentially being designed for a specific task. Alternatively, CPU 310 may contain only a single general-purpose processing unit. RAM 320 may receive instructions from secondary memory 330 using communication path 350.

Screen controller 360 generates display signals (e.g., in RGB format) to touch screen 370 based on data/instructions received from CPU 310. Display unit 370 contains a display screen to display the images (such as the web pages) defined by the display signals. Screen controller 360 may further provide to CPU 310 any data entered by the user using the touch screen. The portions of the screen controller and touch screen enabling a user to provide may be viewed as being part of input interface, described below.

Input interface 390 may correspond to a keyboard, a pointing device (e.g., touch-pad, mouse) and any other buttons type components using which a user provides inputs to the mobile phone. The pointing device may be used, for example, to select (point to) an appropriate portion of a displayed web page (or browser interface) and to perform requisite actions (e.g., clicking on a hyperlink to cause a URL to be sent). The key board may be used to enter a URL of interest.

Wireless interface 380 provides connectivity to base station 120 using appropriate protocols (such as GSM, CDMA, GPRS, etc.). The wireless interface may contain an antenna and filters to process the signals during sending and reception of packets (related to both voice and data). The packets to be transmitted may be received from CPU 310 and the received packets again sent to CPU 310.

Each of audio interface 375 and vibration interface 385 operates under the control of CPU 310. In response to appropriate commands (and associated data) from CPU 310, audio interface 375 generates audible signals. Such commands may be received after the condition of step 230 is satisfied (or after completing display). Vibration interface 385 may also be operated similarly under control of CPU 310. The appropriate commands cause a vibration signal to be generated, and can be used in lie of or in addition to the sound signals.

Secondary memory 330 may contain hard drive 335, flash memory 336, and removable storage drive 337. Secondary memory 330 may store the data and software instructions, which enable mobile phone 115 to provide several features in accordance with the present invention.

In particular, instructions may be stored in the secondary memory (e.g., EEPROM 335 or flash memory 336), and loaded into RAM 320 prior to execution. Alternatively, some or all of the data and instructions may be provided on removable storage unit 340, and the data and instructions may be read and provided by removable storage drive 337 to CPU 310. Floppy drive, magnetic tape drive, CD-ROM drive, DVD Drive, Flash memory, removable memory chip (PCMCIA Card, EPROM) are examples of such removable storage drive 337.

Removable storage unit 340 may be implemented using medium and storage format compatible with removable storage drive 337 such that removable storage drive 337 can read the data and instructions. Thus, removable storage unit 340 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 340 or hard disk installed in hard drive 335. These computer program products are means for providing software to digital processing system 300. CPU 310 may retrieve the software instructions, and execute the instructions to provide various features of the present invention described above.

Conclusion

While various embodiments of the present invention have been described above, it should be understood that they have been presented by way of example only, and not limitation.

Thus, the breadth and scope of the present invention should not be limited by any of the above described exemplary embodiments, but should be defined only in accordance with the following claims and their equivalents.

What is claimed is:

1. A method comprising:
    sending a request for a web page;
    receiving data representing a content of said web page;
    displaying a portion of said web page; and
    dispensing a smell causing substance, wherein said dispensing occurs after receiving said content to indicate that said web page is available.

2. The method of claim 1, wherein said receiving receives an entire content of said web page, and wherein said dispensing occurs after said receiving the entire content of said web page.

3. The method of claim 2, further comprising:
    determining whether a condition indicating an end of response to said request has occurred, wherein said condition comprises reception of said entire content of said web page or partial content only as said response, and wherein said dispensing occurs after occurrence of said condition.

4. The method of claim 3, wherein said condition comprises a timer counting to a pre-specified threshold before download of said entire content of said web page.

5. The method of claim 3, wherein said condition further comprises:
    restarting a timer after receiving each packet of said content; and
    wherein said condition comprises said timer counting to a pre-specified threshold before reception of another packet.

6. The method of claim 1, wherein said dispensing is performed by a mobile device.

7. The method of claim 1, wherein said displaying is performed by a mobile device.

8. A non-transitory machine readable storage medium carrying one or more sequences of instructions causing a mobile device to enable a user to access web pages from a network connected by a wireless communication network, wherein execution of said one or more sequences of instructions by one or more processors contained in said mobile device causes said mobile device to perform the method comprising:
    sending a request for a web page on said wireless communication network;
    receiving data representing a content of said web page from said wireless communication network;
    displaying a portion of said web page; and
    dispensing a smell causing substance independent of said content, wherein said dispensing occurs after receiving said content to indicate that said web page is available.

9. The non-transitory machine readable storage medium of claim 8, wherein said receiving receives an entire content of said web page, and wherein said dispensing occurs after said receiving the entire content of said web page.

10. The non-transitory machine readable storage medium of claim 9, wherein the method further comprises:
    determining whether a condition indicating an end of response to said request has occurred, wherein said condition comprises reception of said entire content of said web page or partial content only as said response, wherein said dispensing occurs after occurrence of said condition.

11. The non-transitory machine readable storage medium of claim 10, wherein said condition further comprises:
    restarting a timer after receiving each packet of said content; and
    wherein said condition comprises said timer counting to a pre-specified threshold before reception of another packet.

12. The non-transitory machine readable storage medium of claim 8, further comprising:
    executing tasks on said mobile device unrelated to said web page during said receiving.

13. A method comprising:
    sending via a mobile device a request for a web page;
    receiving via said mobile device data representing a content of said web page;
    displaying via said mobile device a portion of said web page;
    executing tasks on said mobile device unrelated to said web page during said receiving; and
    dispensing via said mobile device a smell causing substance independent of said content after said receiving to indicate that said web page is available.

14. The method of claim 13, wherein said dispensing occurs after said displaying.

15. The method of claim 13, wherein said receiving receives an entire content of said web page.

16. The method of claim 13, further comprising:
    determining via said mobile device whether a condition indicating an end of response to said request has occurred.

* * * * *